US006999856B2

(12) United States Patent
Lee et al.

(10) Patent No.: US 6,999,856 B2
(45) Date of Patent: Feb. 14, 2006

(54) TRAILER TONGUE LENGTH ESTIMATION USING A TRAILER YAW RATE SENSOR

(75) Inventors: Yong Han Lee, Troy, MI (US); Weiwen Deng, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 187 days.

(21) Appl. No.: 10/650,205

(22) Filed: Aug. 28, 2003

(65) Prior Publication Data

US 2005/0055138 A1    Mar. 10, 2005

(51) Int. Cl.
G06F 17/00    (2006.01)
G05D 1/00    (2006.01)
G08B 21/00    (2006.01)

(52) U.S. Cl. .............................. 701/1; 701/36; 340/341; 340/465; 180/445; 280/482; 280/46

(58) Field of Classification Search ................ 701/1, 701/36, 41–43; 280/400, 407, 407.1, 419, 280/423, 426, 428, 432, 442, 403, 406.1, 280/408, 43, 46, 482, 492–493; 180/14.2, 180/14.4, 14.6, 235, 411–412, 445, 419, 410; 340/431, 440, 459, 463–46, 671–672, 471–472
See application file for complete search history.

(56) References Cited

U.S. PATENT DOCUMENTS

| 4,645,315 A | 2/1987 | Morgavo ..................... 33/707 |
|---|---|---|
| 5,523,947 A | 6/1996 | Breen .......................... 701/36 |
| 5,579,228 A * | 11/1996 | Kimbrough et al. .......... 701/41 |
| 5,747,683 A * | 5/1998 | Gerum et al. ............... 73/118.1 |
| 6,129,170 A * | 10/2000 | Hickman et al. ........... 180/418 |
| 6,292,094 B1 * | 9/2001 | Deng et al. ................. 340/431 |
| 6,516,260 B2 * | 2/2003 | Wetzel et al. ................. 701/50 |
| 6,522,956 B2 * | 2/2003 | Hecker et al. .................. 701/1 |
| 6,655,710 B2 | 12/2003 | Lindell et al. .............. 280/419 |
| 6,668,225 B2 * | 12/2003 | Oh et al. ....................... 701/70 |
| 6,806,809 B2 * | 10/2004 | Lee et al. .................... 340/431 |
| 6,838,979 B2 * | 1/2005 | Deng et al. ................. 340/431 |
| 2002/0107627 A1 * | 8/2002 | Funke et al. .................. 701/70 |
| 2004/0232652 A1 * | 11/2004 | Namuduri et al. ........ 280/455.1 |

* cited by examiner

Primary Examiner—Jacques H. Louis-Jacques
(74) Attorney, Agent, or Firm—Kathryn A. Marra

(57) ABSTRACT

A control system for estimating the tongue length of a trailer being towed by a vehicle in connection with a front wheel steering with or without coordinated rear wheel steering associated with the vehicle. The control system employs an algorithm that calculates an estimated trailer yaw rate based on a corrected tongue length, a front wheel steering angle, a rear wheel steering angle, vehicle speed and a vehicle yaw rate. The estimated trailer yaw rate is compared to a measured trailer yaw rate to generate a yaw rate error that is converted to a tongue length error. The tongue length error is compared to the estimated tongue length to become a corrected estimated tongue length for a next computation period. After a few seconds of processing, the corrected estimated tongue length will be the actual tongue length of the trailer.

20 Claims, 3 Drawing Sheets

TRAILER TONGUE LENGTH ESTIMATION USING A TRAILER YAW RATE SENSOR

BACKGROUND OF THE INVENTION

1. Field of the Invention

This invention relates generally to a control system for estimating the tongue length of a trailer being towed by a vehicle and, more particularly, to a control system for estimating the tongue length of a trailer being towed by a vehicle where the trailer includes a yaw rate sensor, and where the vehicle includes driver operated front-wheel steering with or without computer controlled rear-wheel steering.

2. Discussion of the Related Art

Automotive vehicles that employ coordinated front-wheel steering and rear-wheel steering systems are known in the art. Typically in such coordinated vehicle wheel steering systems, the driver controls the steering of the vehicles front wheels and a computer-based on-board steering controller controls the steering of the vehicles rear wheels in response thereto. In one example, the computer controlled rear-wheel steering system employs an electric motor-driven rack and pinion rear-wheel steering actuator.

Backing up a vehicle-trailer is typically a complex task, and requires a significant level of skill. It is heretofore been known in the art to employ a coordinated front and rear-wheel steering system to assist a driver operating a vehicle pulling a trailer. Particularly, U.S. Pat. No. 6,292,094, issued Sep. 18, 2001 to Deng et al., assigned to the assignee of this application and herein incorporated by reference, discloses a vehicle/trailer backing up control system in connection with a computer controlled rear-wheel steering system. The '094 patent employs an algorithm that uses front-wheel angle, vehicle speed, vehicle yaw rate and hitch angle to control the rear-wheel steering angle to assist the operator in backing up the vehicle-trailer.

The vehicle-trailer back-up control system disclosed in the '094 patent has been shown to be effective in assisting the vehicle operator when backing up a trailer. However, because trailers come in a variety of different lengths, the performance of the back-up control system can be improved by providing an input to the system that gives an estimation of the tongue length of the trailer. The algorithm in the '094 patent uses the same average tongue length for trailers of all lengths.

U.S. patent application Ser. No. 10/336,120, filed Jan. 3, 2003, titled "Trailer Tongue Length Estimation Using a Hitch Angle Sensor," assigned to the assignee of this application, and herein incorporated by reference, discloses a system that estimates the tongue length of a trailer being towed by using a hitch angle sensor that provides a measurement of the hitch angle between the vehicle and the trailer to determine the tongue length. That system has also been shown to be effective in estimating the tongue length of the trailer to improve the ability of the control system to assist the driver in backing-up the trailer. However, further improvements can be made to make the system more practical and more cost effective. For example, because trailer hitches come in a variety of styles, sizes, etc., providing a hitch angle sensor that accurately measures the hitch angle for all of the various types of hitches may be impractical and costly.

SUMMARY OF THE INVENTION

In accordance with the teachings of the present invention, a control system is disclosed for estimating the tongue length of a trailer being towed by a vehicle in connection with a coordinated front and rear-wheel steering system. The control system employs an algorithm that calculates an estimate of the yaw rate of the trailer based on a corrected trailer tongue length, a steering wheel angle, a rear-wheel angle, vehicle speed and vehicle yaw rate applied to a vehicle-trailer kinematics model. The estimated trailer yaw rate is compared to the actual trailer yaw rate measured by a trailer yaw rate sensor to generate a yaw rate error signal. The yaw rate error signal is converted to a tongue length error signal by a PID controller. The tongue length error signal is subtracted from an estimated tongue length to give the corrected trailer tongue length for the next computation period. After a few seconds of processing, the yaw rate error signal will be nearly zero and the tongue length error signal will be nearly zero, and thus, the corrected tongue length will be the actual tongue length of the trailer.

Additional advantages and features of the present invention will become apparent from the following description and appended claims, taken in conjunction with the accompanying drawings.

DETAILED DESCRIPTION OF THE INVENTION

The following discussion of the embodiments of the invention directed to a control system for estimating the tongue length of a trailer being towed by a vehicle employing a coordinated front and rear-wheel steering system is merely exemplary in nature, and is in no way intended to limit the invention or its applications or uses.

Figure 1:
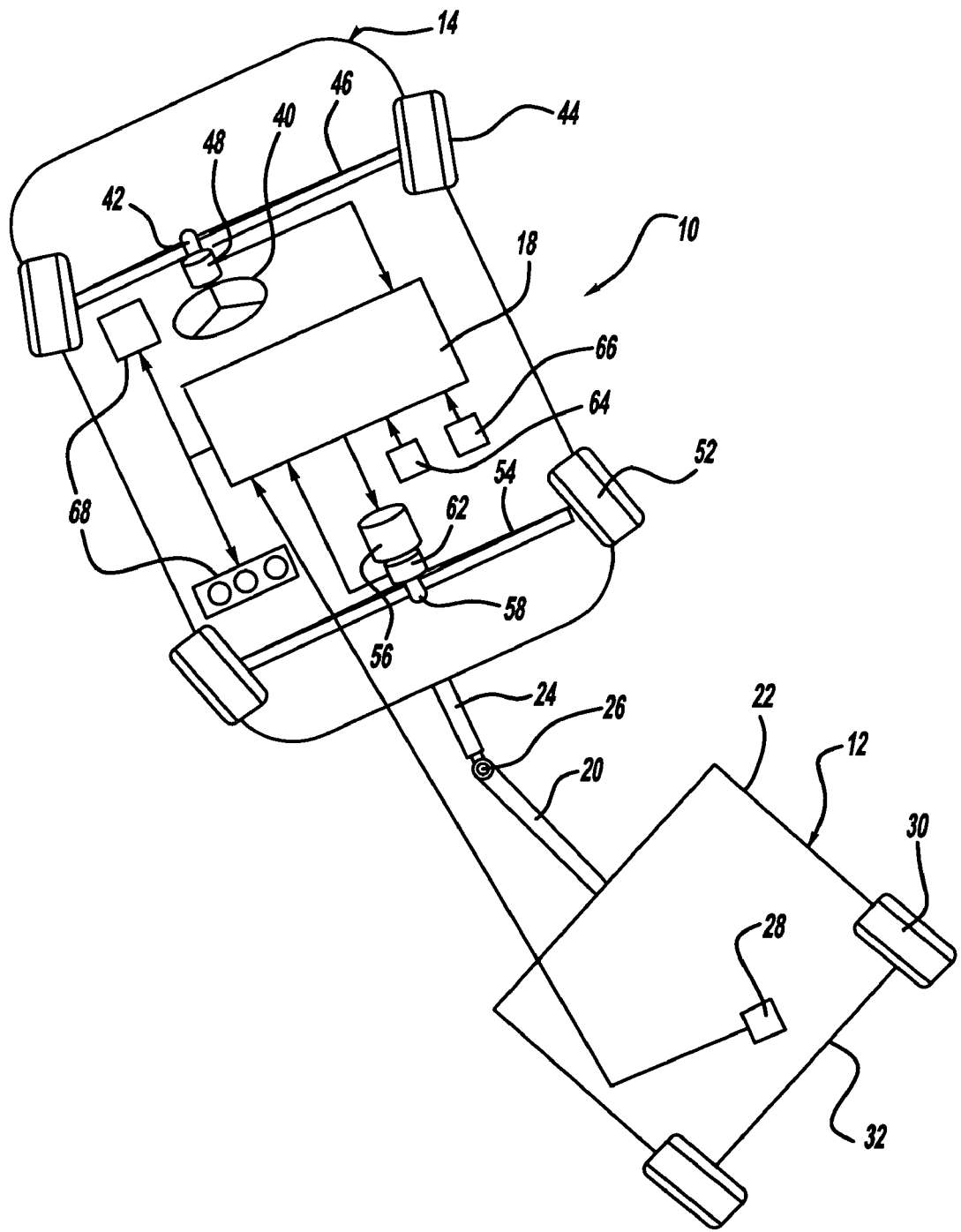
FIG. 1 is a plan view of a vehicle towing a trailer, where the vehicle includes a coordinated front and rear-wheel steering system that provides an estimation of the tongue length of the trailer, according to an embodiment of the present invention.

FIG. 1 is a plan view of a vehicle-trailer system 10 that estimates a tongue length (TL) of a trailer 12 being towed by a vehicle 14. The system 10 is a variation of the backing up control system disclosed in the '094 patent that uses the coordinated front and rear wheel steering system to provide an intelligent vehicle-trailer backing-up system. The system 10 includes a similar controller 18 as the control system in the '094 patent. Further, the system 10 includes various other vehicle sensors used in the control system disclosed in the '094 patent, as will be apparent from the discussion below. The various vehicle sensors discussed below can be any sensor suitable for the purposes discussed herein, and need not be specifically limited to those types of sensors disclosed in the '094 patent. In other embodiments, the tongue length estimation process of the invention can be used in vehicles that do not have assisted rear-wheel steering.

The trailer 12 includes a trailer hitch post 20, a trailer bed 22 and trailer wheels 30 rotatably mounted to a trailer axle 32. In other embodiments, the trailer 12 may include more than one axle each including trailer wheels. The center of the turning radius for those trailers may be between the axles.

The vehicle 14 includes a vehicle hitch post 24 having a hitch 26 that couples the hitch post 24 to the hitch post 20 in any known manner that allows the trailer 12 to be towed by the vehicle 14. As defined herein, the tongue length of the trailer 12 is the distance from the pivot location at the hitch 26 to the rotating center or turning radius of the trailer 12. When the vehicle 14 and the trailer 12 are backing up at a low speed and there is no side slip at the wheels 30, the tongue length of the trailer 12 is the distance from the hitch 26 to the center of the trailer axle 32.

The vehicle 14 includes a steering wheel 40 mounted to a steering column 42 that allows a vehicle operator to steer front wheels 44 of the vehicle 14 through a steering linkage and a front wheel axle 46. A steering wheel angle sensor 48 is mounted to the steering column 42 to provide a front wheel angle signal $\delta_f(t)$ indicative of the steering direction of the wheels 44. The maximum angular movement for a particular vehicle's front wheels is generally fixed, and may be, for example, about +33° to the left or −33° to the right. The signal from the steering wheel angle sensor 48 is provided to the controller 18.

The vehicle 14 also includes rear wheels 52 mounted to a rear wheel axle 54. The rear wheels 52 are turned by an electric motor 56 in connection with a rack and pinion steering mechanism 58 mounted to the axle 54. A rear wheel angle sensor 62 is mounted in combination with the rack and pinion steering mechanism 58, and provides a rear wheel angle signal $\delta_r(t)$ to the controller 18 indicative of the angle of the rear wheels 52.

The vehicle 14 also includes a vehicle speed sensor 64 that measures the speed of the vehicle 14 and provides a vehicle speed signal $V_x(t)$ to the controller 18. The vehicle 14 further includes a vehicle yaw rate sensor 66 that measures the yaw rate of the vehicle 14 and provides a vehicle yaw rate signal $r_v(t)$ to the controller 18. The speed sensor 64 and the yaw rate sensor 66 can be any sensor suitable for the purposes described herein. Further, the trailer 12 includes a trailer yaw rate sensor 28 that measure the yaw rate of the trailer 12 and provides a trailer yaw rate signal $r_t(t)$ to the controller 18.

The controller 18 provides driver signals and commands to a driver advisor 68, including a suitable display, indicative of the operation of the system 10. For example, the vehicle 14 needs to be turning for some period of time to provide the necessary signals to calculate the estimated tongue length of the trailer 12. The driver advisor 68 can be used to instruct the driver to make the necessary turns when the trailer 12 is first connected to the vehicle 14, and tell the driver that the estimated tongue length of the trailer 12 has been calculated thereafter. In one embodiment, the driver advisor 68 is part of an ultrasound rear parking aid (URPA) alarm system.

According to the invention, the vehicle speed signal $V_x(t)$, the front wheel angle signal $\delta_f(t)$, the rear wheel angle signal $\delta_r(t)$, the trailer yaw rate signal $r_t(t)$ and the vehicle yaw rate signal $r_v(t)$ are used to calculate an estimated trailer tongue length. The process of determining the tongue length is discussed below with reference to a kinematics model of a vehicle-trailer system 72, shown in FIG. 2, where reference number 74 represents the vehicle 14 and reference number 76 represents the trailer 12.

Figure 3:
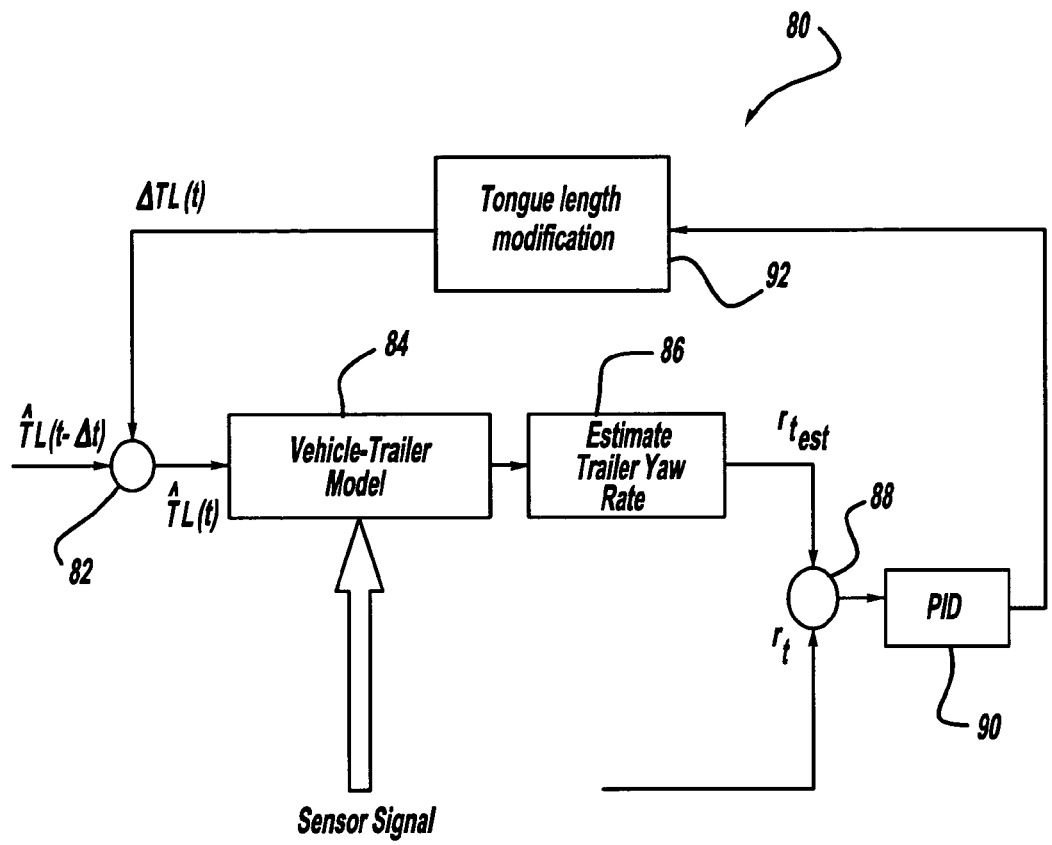
FIG. 3 is a block diagram of a control system employing an algorithm for estimating the tongue length of the trailer shown in FIG. 1 by the kinematics model shown in FIG. 2, according to an embodiment of the present invention.

FIG. 3 is a block diagram of a trailer tongue length estimation system 80 to be used in connection with the system 10. The tongue length estimation system 80 would be included in the controller 18. An initial or previous tongue length estimation signal TL(t−Δt) is applied to a comparator, such as a summer 82. The initial tongue length estimation signal TL (t−Δt) can be based on an average trailer tongue length, for example, 10–12 feet. A tongue length error signal ΔTL(t), described below, is subtracted from the tongue length estimation signal TL(t−Δt) in the summer 82 to provide a corrected tongue length estimation signal TL(t).

When the tongue length estimation process is first initiated, the tongue length error signal ΔTL(t) is zero, and thus the initial tongue length estimation signal TL(t−Δt) outputted from the summer 82 is the corrected tongue length estimation signal TL(t). For subsequent calculation periods, the corrected tongue length estimation signal TL(t) will be closer to the actual trailer tongue length than the initial tongue length estimation signal.

Figure 2:
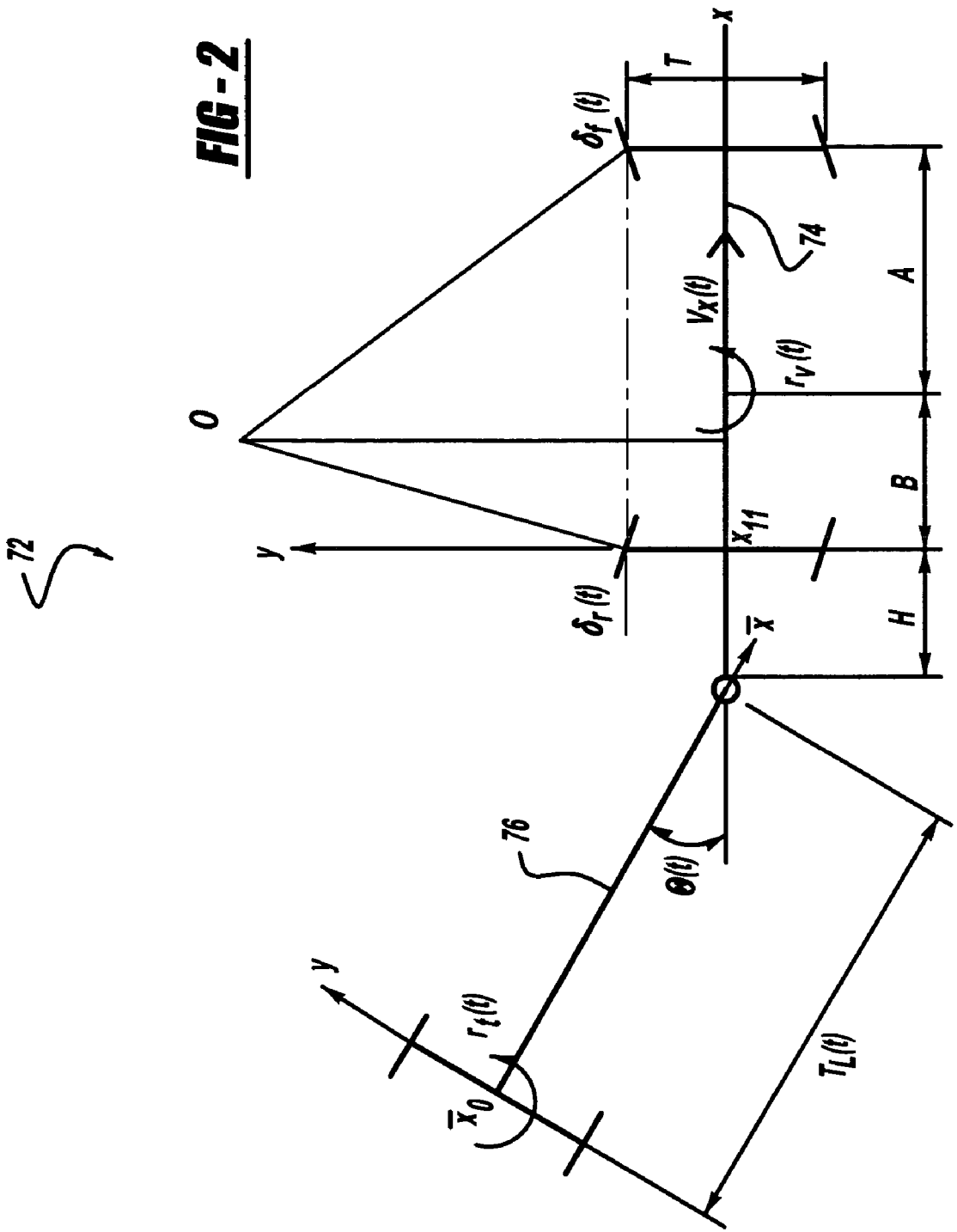
FIG. 2 is a kinematics model of a vehicle-trailer system for the algorithm of the invention.

The corrected tongue length estimation signal TL(t) is applied to a vehicle-trailer kinematics model controller 84 that calculates variables for determining an estimated trailer yaw rate based on the kinematics model shown in FIG. 2. At time t, the input signals of the vehicle speed along the x axis $V_x(t)$, the front wheel angle $\delta_f(t)$, the rear wheel angle $\delta_r(t)$, the vehicle yaw rate $r_v(t)$, and the trailer yaw rate $r_t(t)$ are provided to the system 80. The controller 84 receives the steering wheel angle signal $\delta_f(t)$ from the sensor 48, the rear-wheel angle signal $\delta_r(t)$ from the sensor 62, the vehicle speed signal $V_x(t)$ from the sensor 64 and the vehicle yaw rate signal $r_v(t)$ from the sensor 66.

The controller 84 calculates the lateral velocity component at the hitch 26 for the vehicle side as:

$$V_{yh}(t) = -\left(H + B + \frac{A\tan(\delta_r(t)) - B\tan(\delta_f(t))}{-\tan(\delta_r(t)) + \tan(\delta_f(t))}\right) * r_v(t) \tag{1}$$

A is the distance from the center of the front axle 46 to the center of the gravity point of the vehicle 14, B is the distance from the center of gravity point to the center of the rear axle 54, and H is the distance from the center of the rear axle 54 to the hitch 26.

The longitudinal velocity of the trailer 12 at the hitch 26 is:

$$V_{xh}(t) = V_x(t) \tag{2}$$

The magnitude of the hitch velocity is:

$$V_h(t) = \sqrt{V_{xh}^2(t) + V_{yh}^2(t)} \tag{3}$$

Using the corrected tongue length signal, the lateral hitch velocity for the trailer 12 can be written as:

$$U_{yh}(t) = TL(t) * r_t(t) \tag{4}$$

From the relationship between the vehicle side hitch velocities and the trailer side hitch velocities:

$$U_{yh}(t) = -V_{xh}(t) * \sin(\theta_{est}(t)) + V_{yh}(t) * \cos(\theta_{est}(t)) \tag{5}$$

A hitch angle estimation $\theta_{est}(t)$ can then be calculated as:

$$\theta_{est}(t) = -\sin^{-1}(U_{yh}(t)/V_h(t)) + \sin(V_{yh}(t)/V_h(t)) \tag{6}$$

The hitch angle rate can be estimated by differentiating the hitch angle estimation $\theta_{est}(t)$ from equation (6) by:

$$\dot{\theta}_{est}(t) = \frac{\theta_{est}(t) - \theta_{est}(t - \Delta t)}{\Delta t} \tag{7}$$

The estimated hitch angle rate $\dot{\theta}_{est}(t)$ is then applied to a controller 86 that estimates the trailer yaw rate. The estimated trailer yaw rate $r_{t_{est}}$ is calculated in the controller 86 as:

$$r_{t_{est}}(t) = r_v(t) + \dot{\theta}_{est}(t) \tag{8}$$

The estimated trailer yaw rate $r_{t_{est}}$ is then applied to a subtractor 88 to compare the estimated trailer yaw rate $r_{t_{est}}$ to the measured trailer yaw rate $r_t(t)$ from the sensor 28. This difference is a yaw rate error signal $\Delta r_t(t)$ as determined by:

$$\Delta r_t(t)=r_t(t)-r_{t_{est}}(t)=r_t(t)-(r_v(t)+\theta_{est}(t))=(r_t(t)-r_v(t))+\theta_{est}(t) \quad (9)$$

The yaw rate error signal $\Delta r_t(t)$ is applied to a PID controller 90 to generate a tongue length estimation value as:

$$\Delta TL(t) = K_p * \Delta r_t(t) + K_i \int \Delta r_t(t)dt + K_d \frac{d(\Delta r_t(t))}{dt} \quad (10)$$

$$TL(t)=TL(t-\Delta t)+\Delta TL(t) \quad (11)$$

$K_p$ is a proportional gain constant, $K_i$ is an integral gain constant and $K_d$ is a derivative gain constant. The PID control gains ($K_p$, $K_i$, $K_d$) are assigned using the following PID gain assignment rule. If $|\Delta r_t(t)|>0.1$ degree/sec, then the PID gains are:

$$K_p=0.1, K_i=0.03, K_d=0.00005 \quad (12)$$

otherwise, $$K_p=0.1, K_i=0.2, K_d=0.000001 \quad (13)$$

The PID controller 90 provides the tongue length error signal $\Delta TL(t)$ in this embodiment. However, other controllers may output a different type of signal that needs to be modified to get the tongue length error signal $\Delta TL(t)$. In those embodiments, a tongue length modification system 92 can be employed to convert the output of the PID controller 90 to the tongue length error signal $\Delta TL(t)$.

In order to start the estimation process, some of the input parameters need to be greater than a certain value because the present invention may not work if the vehicle-trailer is moving in a straight path. In other words, the vehicle-trailer needs to move in a circular path to produce a vehicle-trailer yaw rate. For example, the conditions to start the estimation process can be:

$$|V_x(t)|>0.05 \text{ (kph)},$$

$$|r_v(t)|>0.005 \text{ (deg/sec), and} \quad (14)$$

$$|r_t(t)|>0.005 \text{ (deg/sec)}.$$

Although it has been observed that the best maneuver to produce an accurate tongue length estimation is a step steer forward or backward, other turning or sinusoidal steering maneuvers can be used for the estimation process. There is also a stop condition for the estimation process. When the trailer yaw rate estimation error is within a reasonable range for a certain period, the estimated tongue length is accepted as a true value. The stop conditions are dependent upon the noise characteristics of the input data as:

$$|\Delta r_t(t)|<0.005 \text{ (deg/sec) for } t_{duration}>100\Delta t \quad (15)$$

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. A system for estimating a tongue length of a trailer being towed by a vehicle, said vehicle including a pair of front wheels and a pair of rear wheels, said system comprising:
    a front wheel steering angle sensor for providing a front wheel steering angle signal indicative of the angle of the front wheels of the vehicle;
    a vehicle speed sensor for providing a vehicle speed signal indicative of the speed of the vehicle;
    a vehicle yaw rate sensor for providing a vehicle yaw rate signal indicative of the yaw rate of the vehicle;
    a trailer yaw rate sensor for providing an actual trailer yaw rate signal indicative of the yaw rate of the trailer; and
    a tongue length estimation controller for calculating the estimate of the tongue length, said estimation controller calculating the estimate of the tongue length based on an initial trailer tongue length, the front wheel angle signal, the vehicle yaw rate signal, the vehicle speed signal and the actual trailer yaw rate signal.

2. The system according to claim 1 wherein the estimation controller calculates an estimated trailer yaw rate and compares the estimated trailer yaw rate to the actual trailer yaw rate signal to generate a yaw rate error signal therefrom.

3. The system according to claim 2 wherein the tongue length estimation controller converts the yaw rate error signal to a tongue length error signal.

4. The system according to claim 3 wherein the estimation controller includes a PID controller, said PID controller converting the yaw rate error signal to the tongue length error signal.

5. The system according to claim 3 wherein the estimation controller includes a comparator for comparing the tongue length error signal to an initial tongue length estimation signal to generate a corrected tongue length estimation signal.

6. The system according to claim 1 further comprising a rear wheel steering angle sensor for providing a rear wheel steering angle signal indicative of the angle of the rear wheels of the vehicle, said tongue length estimation controller calculating the estimate of the tongue length of the trailer based on all of the front wheel angle signal, the rear wheel angle signal, the vehicle yaw rate signal, the vehicle speed signal and the actual trailer yaw rate signal.

7. The system according to claim 6 wherein the rear wheels of the vehicle are automatically controlled by a rear wheel steering controller in the vehicle.

8. The system according to claim 1 wherein the tongue length estimation controller does not calculate the estimate of the tongue length until certain initial conditions are met, said initial conditions including a certain vehicle speed, a certain vehicle yaw rate and a certain trailer yaw rate.

9. The system according to claim 8 wherein the initial conditions include a vehicle speed greater than 0.05 kilometers per hour, a vehicle yaw rate greater than 0.005 degrees per second and a trailer yaw rate greater than 0.005 degrees per second.

10. The system according to claim 1 wherein the system is used in connection with a coordinated front and rear wheel steering system.

11. A system for estimating a tongue length of a trailer being towed by a vehicle, said vehicle including a pair of front wheels and a pair of rear wheels, where the front wheels are steered by an operator and the rear wheels are automatically steered by an on-board steering controller, said control system comprising:

a front wheel steering angle sensor for providing a front wheel steering angle signal indicative of the angle of the front wheels of the vehicle;

a rear wheel steering angle sensor for providing a rear wheel steering angle signal indicative of the angle of the rear wheels of the vehicle;

a vehicle speed sensor for providing a vehicle speed signal indicative of the speed of the vehicle;

a vehicle yaw rate sensor for providing a vehicle yaw rate signal indicative of the yaw rate of the vehicle;

a trailer yaw rate sensor for providing an actual trailer yaw rate signal indicative of the yaw rate of the trailer; and a tongue length estimation controller for calculating the estimate of the tongue length of the trailer, said estimation controller calculating an estimated trailer yaw rate based on the front wheel angle signal, the rear wheel angle signal, the vehicle yaw rate signal and the vehicle speed signal, said tongue length estimation controller including a first comparator for comparing the estimated trailer yaw rate to the actual trailer yaw rate signal to generate a yaw rate error signal, said estimation controller further including a PID controller that is responsive to the yaw rate error signal, said PID controller converting the yaw rate error signal to a tongue length error signal, said estimation controller further including a second comparator for comparing the tongue length error signal to an initial tongue length estimation signal to provide a corrected tongue length estimation signal.

12. The system according to claim 11 wherein the tongue length estimation controller does not compute the estimate of the tongue length until certain initial conditions are met, said initial conditions including a certain vehicle speed, a certain vehicle yaw rate and a certain trailer yaw rate.

13. The system according to claim 12 wherein the initial conditions include a vehicle speed greater than 0.05 kilometers per hour, a vehicle yaw rate greater than 0.005 degrees per second and a trailer yaw rate greater than 0.005 degrees per second.

14. A system comprising:
a vehicle including at least one front wheel and at least one rear wheel, said vehicle further including a vehicle hitch post;
a trailer including at least one trailer wheel, said trailer further including a trailer hitch post;
a hitch coupling the vehicle hitch post to the trailer hitch post;
a trailer yaw rate sensor for providing an actual trailer yaw rate signal indicative of the yaw rate of the trailer; and
a controller, said controller calculating a tongue length of the trailer based on the actual trailer yaw rate signal.

15. The system according to claim 14 wherein the controller calculates an estimated trailer yaw rate and compares the actual yaw rate signal to the estimated trailer yaw rate, said estimated trailer yaw rate being calculated by an algorithm from inputs including the angle of the vehicle's front wheel, the angle of the vehicle's rear wheel, the yaw rate of the vehicle and the speed of the vehicle.

16. A method of estimating a tongue length of a trailer being towed by a vehicle, said method comprising:
determining the angle of front wheels of the vehicle;
determining the speed of the vehicle;
determining the yaw rate of the vehicle;
determining the actual yaw rate of the trailer; and
calculating the estimate of the tongue length of the trailer based on the front wheel angle, the vehicle yaw rate, the vehicle speed and the actual trailer yaw rate.

17. The method according to claim 16 further comprising determining the angle of rear wheels of the vehicle, wherein calculating the tongue length includes calculating the estimate of the tongue length based on the front wheel angle, the rear wheel angle, the vehicle yaw rate, and the vehicle speed.

18. The method according to claim 16 wherein calculating the estimate of the tongue length includes calculating an estimated trailer yaw rate and comparing the estimated trailer yaw rate to the actual trailer yaw rate to generate a yaw rate error signal.

19. The method according to claim 18 wherein calculating the estimate of the tongue length includes converting the yaw rate error signal to a tongue length error signal.

20. The method according to claim 19 wherein calculating the estimate of the tongue length includes comparing the tongue length error signal to an initial tongue length estimation signal to generate a corrected tongue length estimation.

* * * * *